United States Patent
Han

Patent Number: 5,217,096
Date of Patent: Jun. 8, 1993

[54] BRAKE HOLDING SYSTEM

[76] Inventor: Joon Ho Han, 816 Gregorio Dr., Silver Spring, Md. 20901

[21] Appl. No.: 850,143

[22] Filed: Mar. 12, 1992

Related U.S. Application Data

[63] Continuation of Ser. No. 677,419, Mar. 29, 1991, abandoned.

[51] Int. Cl.[5] .......................................... B60K 41/20
[52] U.S. Cl. ................................. 192/1.23; 192/1.33
[58] Field of Search ..................... 192/1.1, 1.2, 1.21, 192/1.23, 1.24, 1.31, 1.32, 1.33, 1.34, 1.35; 188/265; 303/89

[56] References Cited

U.S. PATENT DOCUMENTS

| | | | |
|---|---|---|---|
| 1,927,209 | 9/1933 | Gilmore | 192/0.049 |
| 2,015,192 | 9/1935 | Russell | 192/1.21 |
| 2,079,978 | 5/1937 | Weiss | 192/1.31 |
| 2,235,412 | 3/1941 | Weiss et al. | 192/1.33 |
| 2,308,822 | 1/1943 | Murphy | 192/1.32 |
| 2,313,232 | 3/1943 | Freeman | 192/1.35 |
| 2,642,484 | 6/1953 | Price | 361/195 |
| 2,690,824 | 10/1954 | Forman | 192/1.35 |
| 2,843,235 | 7/1958 | Weaver | 192/1.23 |
| 2,849,557 | 8/1958 | Long | 200/61.9 |
| 2,904,134 | 9/1959 | Cieply, Jr. | 188/152 |
| 2,938,611 | 5/1960 | Cooke | 192/1.32 |
| 2,973,844 | 3/1961 | Prather | 192/1.32 |
| 3,021,821 | 2/1962 | Prather | 91/373 |
| 3,315,536 | 4/1967 | Claeys | 74/480 R |
| 4,446,950 | 5/1984 | Wise et al. | 192/1.23 |
| 4,646,903 | 3/1987 | Han | 192/1.31 |
| 4,696,222 | 9/1987 | Han | 192/1.32 |
| 4,949,820 | 8/1990 | Fontaine et al. | 192/1.23 |

*Primary Examiner*—Richard M. Lorence

[57] ABSTRACT

A brake holding system for a vehicle, comprising a vacuum magnetic member, a brake pedal extension arm which is attached to a push rod which, in turn, is connected to the master cylinder. The brake holding system can be actuated by a vacuum magnetic member when the speed of the vehicle is reduced to 0 mph under activation of a plurality of sensors while the vehicle is completely stopped.

3 Claims, 3 Drawing Sheets

BRAKE HOLDING SYSTEM

This application is a continuation of application Ser. No. 07/677,419 filed on Mar. 29, 1991, now abandoned.

BACKGROUND OF THE INVENTION

1. Field of the Invention

The present invention relates to an improved brake holding system of an automotive vehicle. More particularly, the present invention is directed to a brake holding system for vehicles comprising a vacuum magnetic device operatively associated with a brake pedal extension arm which is attached to a push rod connected to the master cylinder, whereby when the speed of the automobile is reduced to 0 mph such as, for example, at a stoplight, the brake is automatically engaged and maintained and thus the operator does not need to keep his foot on the brake pedal. The brake can then be automatically released when the accelerator pedal is depressed by the operator for advancing the automobile.

2. Description of the Prior Art

In many of the brake holding and releasing systems known in the art, the mechanism are very complicated, rendering them unacceptable for commercial applicability or availability. Such brake controlling systems are shown in U.S. Pat. No. 1,927,209 to Gilmore, U.S. Pat. No. 2,235,424 to Weiss et al, U.S. Pat. No. 2,308,822 to Murphy, U.S. Pat. No. 2,313,232 to Freeman, U.S. Pat. No. 2,642,484 to Price, U.S. Pat. No. 2,690,824 to Forman, U.S. Pat. No. 2,843,235 to Weaver, U.S. Pat. No. 2,849,557 to Long, U.S. Pat. No. 2,904,134 to Cieply, Jr., U.S. Pat. No. 2,938,611 to Cook, U.S. Pat. No. 2,973,844 to Prather, U.S. Pat. No. 3,021,821 to Prather, U.S. Pat. No. 3,315,536 to Caleys, and U.S. Pat. No. 4,446,950 to Wise et al. Also, U.S. Pat. Nos. 4,646,903 and 4,696,222, issued to the present inventor, disclose a brake holding system for vehicles, comprising a vacuum and magnetic device including a brake holder, a moon gear having a plurality of teeth, a push rod connected to a master cylinder, a speed monitoring device having a needle being contacted to a switch member and a brake releasing switch operatively associated with the accelerator. The brake holding system can be placed into position when the speed of the vehicle is reduced to between 0 and 5 mph by application of the brake pedal. The brake is then automatically unlocked by depressing the accelerator pedal. Also, the driver can pull an emergency handle to mechanically release the brake. However, this brake holding system is very complicated to manufacture and cannot be applied to the vehicle conveniently and reliably.

SUMMARY OF THE INVENTION

Accordingly, it is an object of the present invention to provide an improved brake holding system of an automotive vehicle.

Another object of the present invention is to provide a brake holding system which can safely lock a braking system on a vehicle when the speed of the automobile is reduced to 0 mph.

A further object of the present invention is to provide a brake holding system which automatically unlocks the brake when the accelerator pedal is depressed.

Still another object of the present invention is to provide a brake holding system which is easy to operate and does not require the operator to keep a foot on the brake pedal at all times to prevent the vehicle from moving. Accordingly, it is particularly useful when the operator is a woman, a senior citizen, or a young adult.

Yet another object of the present invention is to provide a brake holding system which is simple, and inexpensive to manufacture and can be readily installed on a used car.

Still another object of the present invention is to provide a brake holding system comprising a vacuum magnet unit which is connected to the original vacuum system of the automobile.

A further object of the present invention is to provide a brake holding system which automatically locks a vehicle only when the vehicle is stationary since the brake holding system is deactivated by deactivating a plurality of sensors during the time when the vehicle is moving.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a brake holding system for a vehicle, comprising a vacuum magnetic member, a brake pedal extension arm which is attached to a push rod which, in turn, is connected to the master cylinder. The brake holding system can be actuated by the vacuum magnetic member when the speed of the vehicle is reduced to 0 mph under activation of a plurality of sensors during the time when the vehicle is completely stopped.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
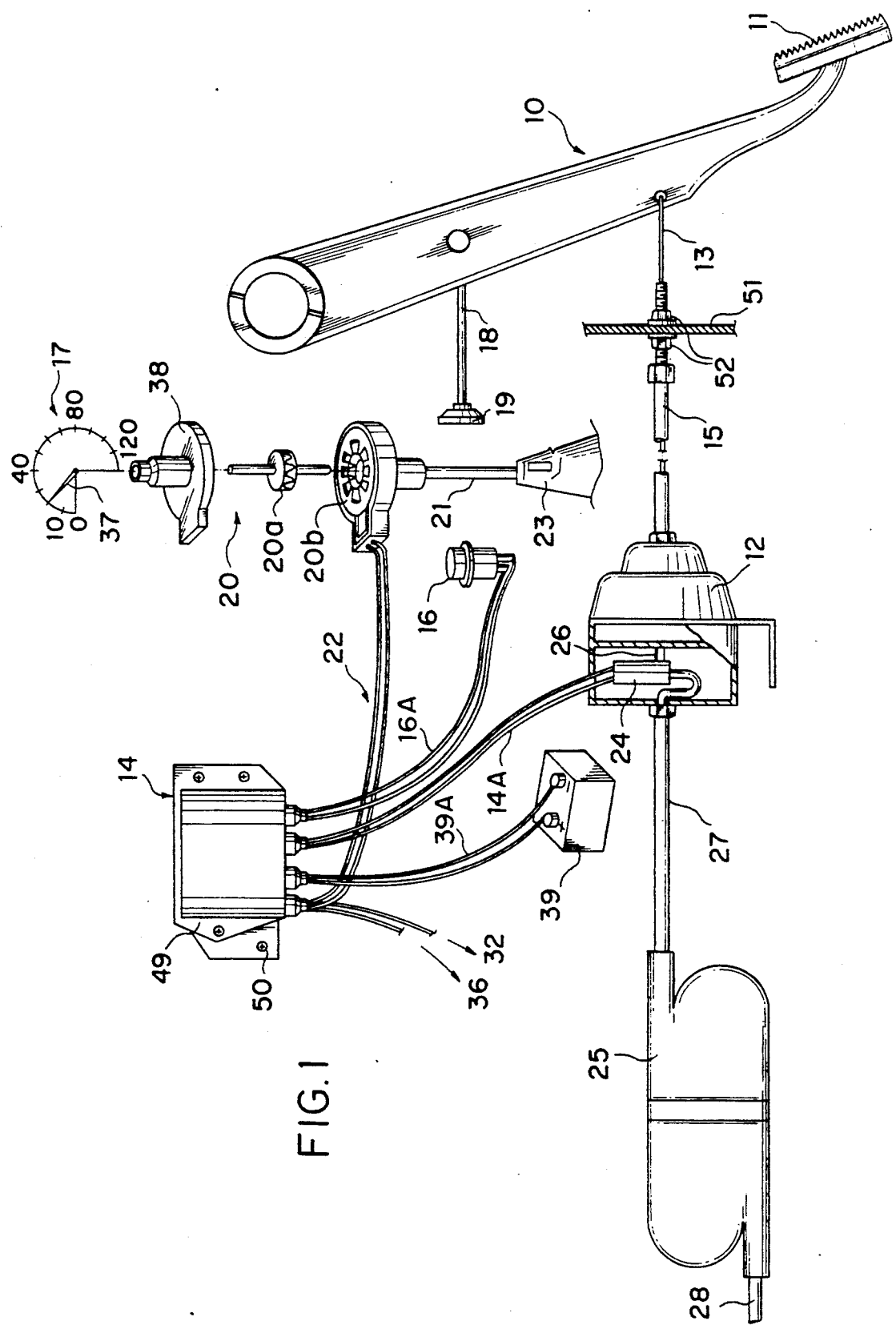
FIG. 1 is a perspective view of the brake holding system showing components of the brake holding system of the present invention.
Figure 2:
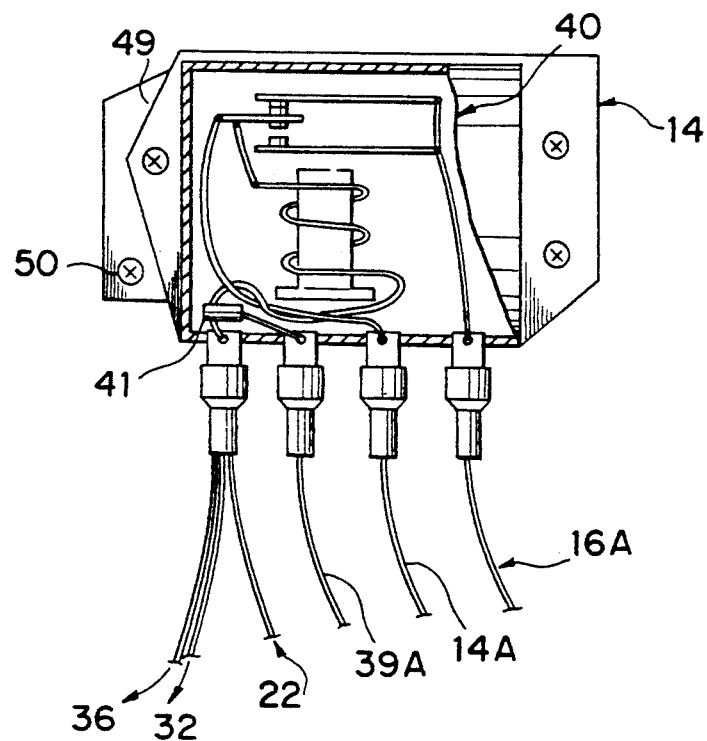
FIG. 2 is a perspective view of the brake holding system of the present invention.

Referring now in detail to the drawings for the purpose of illustrating preferred embodiments of the present invention, the brake holding system for a vehicle as shown in FIGS. 1 and 2, comprises a brake pedal extension arm 10 having a brake pedal 11, a vacuum activator 12 connected to the brake pedal extension arm 10 via a connecting steel wire 13 and connected to a vacuum tank 25, and a control box 14 containing a magnetic member 40. The control box 14 is connected to a button or on-off switch through wires 16A and an odometer 17 through a speed monitoring sensor 20. And a push rod 18 is connected to a master cylinder 19 and is also attached to the brake pedal extension arm 10. Also, the connecting steel wire 13 is movably disposed within a pipe 15. The pipe is passed through a partition 51 and is held in place with a pair of adjustable nuts 52.

Figure 4:
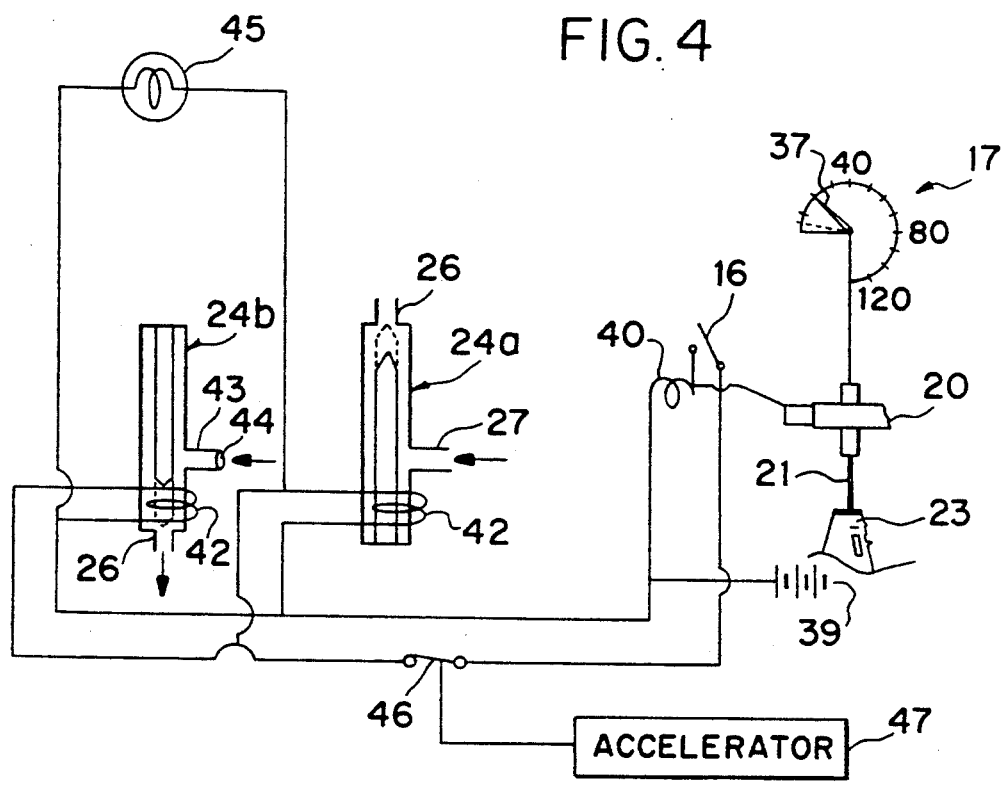
FIG. 4 shows the electrical circuit of the vacuum and magnetic systems of the brake holding system of the present invention.

As shown in FIGS. 1 and 4, the speed monitoring sensor 20 is connected to the odometer 17 and thus senses movement of a needle 37. The sensor is also connected to the control box 14 through sensor wires 22. The odometer 17 is directly connected to the vehicle transmission 23 through the speed monitoring sensor 20 by a odometer cable 21. The speed monitoring sensor 20 is a magnet sensor which includes a permanent magnet 20a wrapped by an electric coil group 20b, and an odometer cover 38 is provided for covering the permanent magnet 20a and the electric coil group 20b, whereby when the odometer 17 is not being activated by the cable 21 electricity is not generated since there is no movement of the permanent magnet 20a within the coil group 20b. In turn, when the odometer 17 is being activated by the cable 21, electricity is generated by the rotation of the permanent magnet 20a within the coil group 20b. Therefore, the speed monitoring sensor 20 produces no signal where there is a reading of 0 mph on the odometer 17.

Figure 5A:
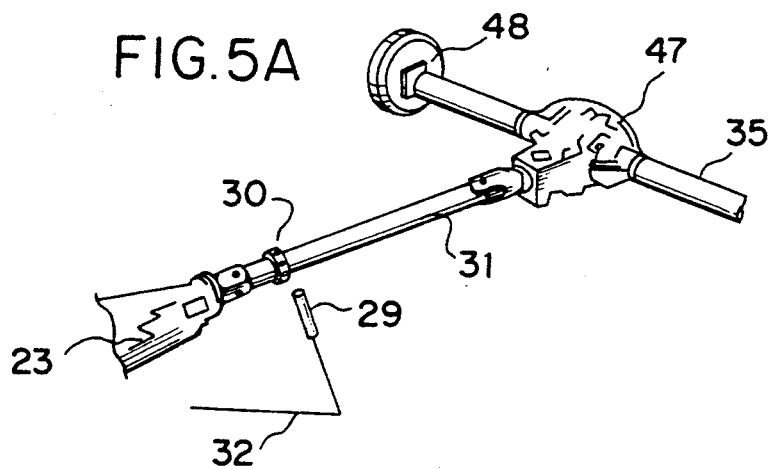
FIGS. 5A and 5B are perspective views of a sensor for an axle shaft and a sensor for an axle of the present invention, respectively.
Figure 5B:
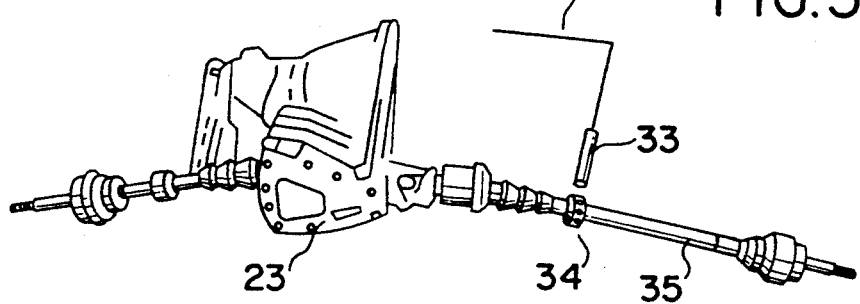

Also, as shown in FIGS. 5A and 5B, a shaft magnet sensor 29 is positioned in close proximity to a shaft joint 30 where a driven shaft 31 connected to an axle 35 of the rear wheel 48 via a differential gear 47 is mounted to the transmission 23. An axle magnet sensor 33 is positioned in close proximity to an axle joint 34 where the axle 35 of one of the front wheel is mounted to the transmission 23. Thus, through sensor wires 32, 36 and 22 these shaft and axle magnet sensors 29 and 33, and the speed monitoring sensor 20 are connected to a sensor unit 41 which is operatively connected to the circuit of the magnet member 40 of the control box 14 (FIG. 2). In other words, signals are conducted through sensor wires 22, 32 and 36 to sensor unit 41 which senses any conducted signals in sensor wires 22, 32 and 36. That is, when the sensor unit 41 is actuated, the circuit is completed, and on the contrary, when the sensor unit 41 is deactivated, the circuit is not completed. Accordingly, at this time, even though the operator pushes the button 16, the magnet member 40 does not activate. That is, when the vehicle is moving, the brake holding system of the present invention does not work even though the operator pushes the button 16.

Figure 3:
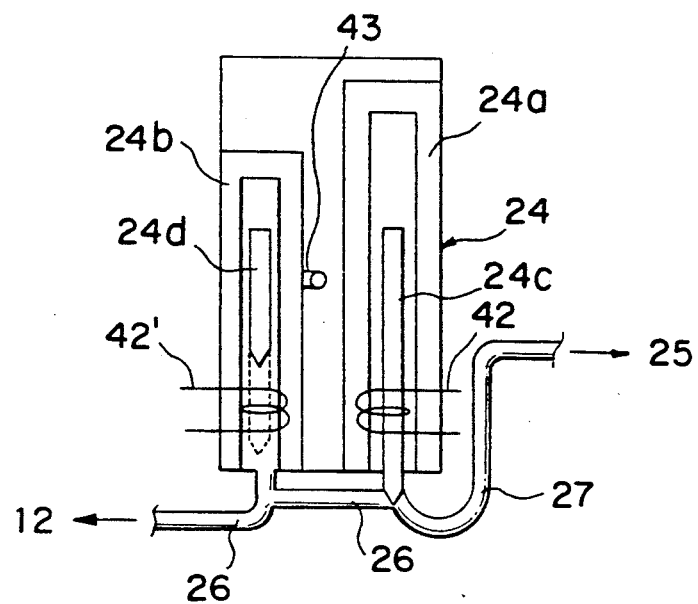
FIG. 3 is a diagrammatic view showing an on/off member of the brake holding system of FIGS. 1.

As shown in FIGS. 1 and 3, the vacuum activator 12 is connected to an on/off-member 24 including an on-member 24a and an off-member 24b through a hose 26. Also, the on/off-member 24 is connected to the control box 14 through wires 14A and to a vacuum tank 25 through a hose 27 and the vacuum tank 25 is connected to a vacuum system (not shown) of the vehicle via a hose 28.

As shown in FIG. 2, the control box 14 includes a housing 49 containing the magnet member 40, and a plurality of apertures for fixing to a support member through screws 50. The magnet member 40 is a kind of a relay switch so that, when the circuit is complete, the relay switch 40 is in an on-position since the magnet member 40 is actuated to function as a magnet. A battery 39 is connected to the control box 14 by wires 39A.

Diagrammatic FIG. 3 shows on/off-member 24 in the off configuration wherein movable member 24c of on-member 24a is positioned to interrupt communication between hose 26 and hose 27, while movable member 24d of off-member 24b is positioned so that atmospheric air from air inlet 43 will flow into hose 26 and to the actuator 12.

Also with reference to the diagrammatic view of FIG. 3, when then on/off-member 24 is in the on configuration, the movable member 24c of on-member 24a is raised to allow communication between hose 26 and hose 27, while the member 24d is lowered to the dashed line position so that air from air inlet 43 can no longer enter hose 26.

The brake holding system of the present invention operates as follows:

When the vehicle is to be stopped for a fixed period of time such as, for example, at a stoplight, and thus when the speed of the vehicle is reduced to 0 mph by the application of the brake pedal, the vacuum actuator 12 tightly holds the brake pedal extension arm 10 so that the push rod 18 applies brakes through the master cylinder.

As shown in FIGS. 2 and 4, when the needle 37 of the odometer 17 of the vehicle is positioned at 0 mph, the speed monitoring sensor 20 is actuated and simultaneously, when the operator pushes the button 16, the magnet member 40 is actuated, the circuit is completed with the battery 39, and the magnetic member 40 is actuated to function as a magnet.

As shown in FIGS. 3 and 4, at this time, the on-member 24a provides communication through the hose 26 to the vacuum tank 25 or the vacuum system through the hose 27 or the hoses 27 and 28 when the energized coils 42 and 42' are magneted. Simultaneously, the off-member 24b is maintained in a closed position. When the operator does not depress the accelerator, a releasing switch 46 is in an on-position and the on-member 24a is opened to communicate between the hoses 26 and 27.

On the other hand, the off-member 24b is closed to prevent communication with the air through air inlet 43 which contains a filter 44. Because the magnetic coils 42 and 42' are energized, respectively, the vacuum actuator 12 pulls the connecting steel wire 13 together with the brake pedal extension arm 10 and indirectly pushes the push rod 18 to the master cylinder 19 since the connecting steel wire 13 and the push rod 18 are fixed to the brake pedal extension arm 10. At this time, there is no need to apply further pressure to the brake pedal 11 since the push rod 18 is in a fixed state relative to the master cylinder 19.

When the accelerator 47 is depressed, the releasing switch 46 is opened and deenergizes the magnet coils 42 and 42' of the on/off-member 24 which causes the off-member 24b to communicate with the air through the air inlet 43 and the filter 44. Simultaneously, the on-member 24a closes to interrupt the vacuum which causes the brake pedal extension arm 10 to return to its original position due to the bias thereof. Because the magnet coils 42 and 42' of the on/off-member 24 are not energized, the vacuum actuator 12 is not functioning, and therefore, the vacuum actuator 12 cannot now pull the brake pedal extension arm 10. A lamp 45 disposed on the dashboard indicates the operation of both holding and releasing conditions. Also, when the releasing switch 46 is opened by pushing the accelerator, the magnet coil 42 of the on-member 24a is deenergized because the magnet member 40 is not maintained in a continuously closed state.

Also, if the operator applies the brake pedal 11 when the speed of the vehicle is above 0 mph, the holding system of the present invention does not actuate because the needle 37 separates from 0 mph and the speed monitoring sensor 20 deactivates so that the circuit with the battery 39 is interrupted. When the driven shaft 31 and axle 35 rotate, the shaft and axle sensors 29 and 33 do not activate. Therefore, even though the operator pushes the button 16, the circuit with the battery 39 is interrupted.

Accordingly, the brake holding system of the present invention is very simple to manufacture. Also, it is very easy to apply the brake holding system of the present invention to the new cars or used cars conveniently or reliably.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A brake holding system for a vehicle having in combination, a brake pedal, master cylinder, a vacuum system and a power supply, which comprises:
    a connecting steel wire connected at one end to a brake pedal extension arm of said brake pedal,
    a vacuum actuator means connected to the other end of said connecting steel wire for pulling said connecting steel wire when said vacuum actuator is connected to a vacuum source,
    an on-off member means for selectively connecting said vacuum actuator to said vacuum source when actuated, with connection being made in an on position, but not in an off position,
    control means for selectively actuating said on-off member means,
    said control means including a button means operable by a seated operator for setting said on-off member means in the on position to connect said vacuum actuator to said vacuum source, a speed monitoring sensor mounted to sense movement of an odometer cable, and a shaft sensor means mounted to sense rotational movement of a driven shaft,
    said control means also including means responsive to sensed movement by at least one of said sensors for preventing the operation of said button means from setting said on-off member means in the on position; and
    said control means also including a releasing switch means which is operated in response to the depression of an accelerator pedal and functions to position the on-off member means in the off position.

2. A brake holding system for a vehicle according to claim 1, wherein said driven shaft is a drive shaft which is connected to rotate rear wheels of the vehicle.

3. A brake holding system for a vehicle according to claim 1, wherein said driven shaft is on axle which is connected to rotate a front wheel of the vehicle.

* * * * *